US008648266B2

(12) United States Patent  
Bucher et al.

(10) Patent No.: US 8,648,266 B2
(45) Date of Patent: Feb. 11, 2014

(54) MULTIPLE FORCE-MEASURING DEVICE, FORCE-MEASURING MODULE, AND METHOD FOR MONITORING A CONDITION OF THE MULTIPLE FORCE-MEASURING DEVICE

(75) Inventors: Cyrill Bucher, Uster (CH); Aaron Skidmore, Columbus, OH (US); Douglas Bliss, Worthington, OH (US); Markus Uster, Nänikon (CH)

(73) Assignee: Mettler-Toledo AG, Greifensee (CH)

( * ) Notice: Subject to any disclaimer, the term of this patent is extended or adjusted under 35 U.S.C. 154(b) by 0 days.

(21) Appl. No.: 12/632,234

(22) Filed: Dec. 7, 2009

(65) Prior Publication Data

US 2010/0084199 A1  Apr. 8, 2010

Related U.S. Application Data

(63) Continuation of application No. PCT/EP2008/053623, filed on Mar. 27, 2008.

(60) Provisional application No. 60/942,468, filed on Jun. 7, 2007.

(51) Int. Cl.
*G01G 19/00* (2006.01)

(52) U.S. Cl.
USPC ..................................... 177/25.13; 177/199

(58) Field of Classification Search
USPC ........................... 177/25.13–25.19, 199–200; 702/173–175
See application file for complete search history.

(56) References Cited

U.S. PATENT DOCUMENTS

| 3,845,472 | A | * | 10/1974 | Buchanan et al. ............. 370/222 |
| 3,904,812 | A | * | 9/1975 | Daffron ......................... 174/549 |
| 4,409,641 | A | * | 10/1983 | Jakob et al. .................... 361/720 |
| 4,723,196 | A | * | 2/1988 | Hofmeister et al. ........... 361/759 |
| 4,815,547 | A | | 3/1989 | Dillon et al. |
| 5,004,058 | A | * | 4/1991 | Langford et al. ............ 177/25.13 |
| 5,135,062 | A | | 8/1992 | Lockery et al. |
| 5,765,031 | A | * | 6/1998 | Mimuth et al. .................. 714/43 |
| 6,365,845 | B1 | * | 4/2002 | Pearce .......................... 177/25.18 |
| 6,566,613 | B1 | | 5/2003 | Gesuita et al. |
| 6,639,156 | B2 | * | 10/2003 | Luke et al. .................. 177/25.13 |
| 6,833,514 | B2 | * | 12/2004 | Gesuita et al. ............. 177/25.18 |
| 6,919,516 | B2 | * | 7/2005 | Frye et al. ................... 177/25.13 |
| 6,940,290 | B2 | | 9/2005 | Ishida |
| 7,151,230 | B2 | | 12/2006 | Brighenti |
| 7,211,748 | B2 | * | 5/2007 | Lauke et al. .................... 177/199 |
| 7,375,293 | B2 | * | 5/2008 | Beshears et al. ............ 177/25.13 |
| 7,620,506 | B2 | | 11/2009 | Kuwayama et al. |

(Continued)

FOREIGN PATENT DOCUMENTS

| DE | 10150641 A1 | 10/2002 |
| DE | 102004001909 A1 | 8/2005 |

(Continued)

*Primary Examiner* — Randy W Gibson
(74) *Attorney, Agent, or Firm* — Standley Law Group LLP

(57) ABSTRACT

A multiple force-measuring device, especially a multiple weighing device has at least two force-measuring modules. Each force-measuring module includes a force-measuring cell and a power delivery means. The power delivery means of at least one of the force-measuring modules in this arrangement is connected, directly or through a junction element, to a control cable that is connected to a power supply unit. The force-measuring modules are connected directly to each other through a module-connection cable that transfers electrical power therebetween.

11 Claims, 6 Drawing Sheets

(56) References Cited

U.S. PATENT DOCUMENTS

| | | | | |
|---|---|---|---|---|
| 8,076,595 | B2* | 12/2011 | Uster | 177/25.13 |
| 8,385,561 | B2* | 2/2013 | Merrey et al. | 381/77 |
| 2001/0034671 | A1* | 10/2001 | Luke et al. | 705/28 |
| 2001/0037903 | A1* | 11/2001 | Breed et al. | 177/25.13 |
| 2002/0101041 | A1* | 8/2002 | Kameyama | 277/628 |
| 2003/0205413 | A1* | 11/2003 | Gesuita et al. | 177/25.18 |
| 2004/0026135 | A1* | 2/2004 | Huitt et al. | 177/210 R |
| 2006/0111868 | A1* | 5/2006 | Beshears et al. | 702/173 |
| 2007/0067141 | A1* | 3/2007 | Beshears et al. | 702/173 |
| 2007/0223722 | A1* | 9/2007 | Merrey et al. | 381/77 |
| 2010/0078228 | A1* | 4/2010 | Trautweiler et al. | 177/25.13 |
| 2010/0263940 | A1* | 10/2010 | Klauer et al. | 177/1 |

FOREIGN PATENT DOCUMENTS

| | | |
|---|---|---|
| JP | 58-210525 A | 12/1983 |
| JP | 61-288124 A | 12/1986 |
| RU | 2220900 C2 | 1/2004 |

* cited by examiner

US 8,648,266 B2

MULTIPLE FORCE-MEASURING DEVICE, FORCE-MEASURING MODULE, AND METHOD FOR MONITORING A CONDITION OF THE MULTIPLE FORCE-MEASURING DEVICE

CROSS-REFERENCE TO RELATED APPLICATIONS

This application is a continuation under 35 USC §120 of PCT/EP2008/053623, filed 27 Mar. 2008, which is in turn entitled to benefit of a right of priority under 35 USC §119 from U.S. provisional application 60/942468, filed 7 Jun. 2007. The content of each of the applications is incorporated by reference as if fully recited herein.

TECHNICAL FIELD

The disclosed embodiments relate to a multiple force-measuring device, in particular a multiple weight-measuring device, and to a force-measuring module, as well as a method of operating the force-measuring device.

BACKGROUND OF THE ART

Under the definition used herein, a multiple force-measuring device includes at least two force-measuring modules and an indicator device. The force-measuring module, in turn, includes an electromechanical force-measuring cell serving to determine a force, which functions as a measurement converter in that it converts the input quantity, which is a mechanical force, into an electrical output signal. A special type of multiple force-measuring device exists in the form of a weighing scale with a plurality of weighing devices, so-called weighing modules. The force-measuring cell is configured in this case as a weighing cell and serves for the mechanical-to-electrical conversion whereby the weight force exerted by a weighing object is converted into an electrical signal. Accordingly, a force-measuring module or a weighing module as the term is understood here means, respectively, a force-measuring device or a weighing scale without an indicator device.

A multiple force-measuring device under the terminology used herein is a force-measuring device in which the force to be measured is distributed by means of a mechanical device, in particular a measuring plate or a container, onto a plurality of force-measuring modules. Each force-measuring module in this arrangement includes a force-measuring cell, by means of which the portion of the force that is imparted to the respective module can be individually determined. The results from the individual force-measuring cells are then passed on to a common output device, where they are combined into an overall result.

Multiple force-measuring devices are used for example in industrial installations for the weighing of the contents of basins, tanks, reactor vessels and the like. Typically in these kinds of applications the weighing modules are configured as high-capacity weighing modules, as so-called tank weighing cells or reactor vessel weighing cells. For each container to be weighed, a plurality of weighing modules are arranged between the feet of the container and the foundation. Thus, each foot of the container rests on a force-measuring module. In order to determine the weight of the container and/or of its contents, the measurement values determined by the force-measuring modules need to be added, as each measurement value represents a part of the mass. This calculation is in most cases performed in a processor device and/or controller device set up in an adjacent location.

High-capacity force-measuring cells also find application as weighing modules in weighing scales for trucks. Truck scales typically have several measuring plates or weighing plates, each of which rests on a plurality of force-measuring modules. Accordingly, each force-measuring module measures a partial weight of the truck and/or of one or more trailers. The measuring results of the individual force-measuring modules are transmitted to a common processor device that is located at some distance from the measuring plates and from the force-measuring modules, for example in a controller device located as much as several hundred meters away.

According to U.S. Pat. No. 7,151,230 to Brighenti ("Brighenti '230"), the processor device is implemented as an external device in the form of a so-called weighing terminal. By way of an indicator device that belongs to the weighing terminal, the results of the multiple force-measuring device can be released. In addition, a device for supplying the multiple force-measuring device with power is arranged in the processor device. Accordingly, the individual force-measuring modules are supplied with electrical energy through this central power supply.

To transmit the measurement results and the supply current, the force-measuring modules are connected through cables to the processor device. Typically in such an arrangement, the supply current and the transmission of the measurement value are in the same cables, although by separate conductors. Furthermore, as a means to simplify the cable arrangement, the individual force-measuring modules are connected by shorter distributor lines to a distribution device, and only the latter has a direct connection through an individual cable, the so-called "home-run" cable, directly to the controller device. The power supply and the transmission of the measurement values are thus merged in the distribution device in order to avoid multiple parallel cables over the distance between the measuring plates and the controller building.

As shown in U.S. Pat. No. 5,135,062 to Lockery, if there are four force-measuring modules, the distribution device can be arranged so that it is located at the center of a rectangle formed by the four force-measuring modules. As a result, a short cable length is achieved between the force-measuring modules and the distribution device, which in consequence reduces electrical disturbances and mechanical stresses and also lowers the cost of cabling.

Particularly in larger installations, for example in weighing installations for trucks, there are often many measuring plates and force-measuring modules involved, for example four measuring plates with a total of sixteen force-measuring modules. As a result, one arrives at a multi-layered, cascaded or hierarchic network of distribution devices in order to achieve the desired merging of the connections. In the case of sixteen force-measuring modules, one ends up for example with a first level of four distribution devices, a second lever of two distribution devices, and one third-level distribution device, thus a total of seven distribution devices.

However, the distribution devices are expensive and susceptible to interference. The probability of errors in the installation process as well as during operation and maintenance increases with the rising number of components. It is therefore desirable to assemble a force-measuring device with the smallest possible number of distribution devices.

In the Brighenti '230 weighing device, eight weighing modules are connected to a central distribution device. Thus, the use of intermediate hierarchic levels of distribution devices can be dispensed with. The central distribution device serves a common juncture for the power supply as well as for the communication leads and offers the advantage of a simple arrangement of the conductor lines. Nevertheless, in most cases this arrangement involves longer distribution leads and a larger overall length of the distribution leads, thus an increased susceptibility to interference and higher costs.

To avoid these drawbacks, the cabling of the weighing modules is replaced in U.S. Pat. No. 6,919,516 to Frye by a radio transmission and individual independent power supplies of the individual weighing modules. The distribution device functions in this case as a radio relay for the transmission of the signals from the weighing modules to the processor device. Furthermore, the distribution device, too, is equipped with an independent power supply in order to eliminate all cabling. Batteries are used for the individual independent power supplies of the weighing modules and the distribution device. However, this solution has the disadvantage that the charge level of the batteries has to be checked at regular intervals, and that insufficiently charged batteries have to be recharged or exchanged. Besides, typically the performance of the batteries depends strongly on extraneous influence factors of the environment, in particular the ambient temperature. Expensive checking and monitoring activities are therefore required in order to ensure a stable, reliable operation of the weighing modules, particularly in outdoor applications.

It, therefore, an objective to propose a multiple force-measuring device, in particular a multiple weighing device, a force-measuring module, and a method of operating said multiple force-measuring device, whereby a simple and cost-effective design configuration as well as a fail-safe operation can be achieved.

SUMMARY

This objective is met by a multiple force-measuring device, a force-measuring module and a method with the features specified in the independent claims. Advantageous embodiments are presented in additional, dependent claims.

The multiple force-measuring device, in particular a multiple weighing device, has at least two force-measuring modules, each of which includes a force-measuring cell and an electrical power delivery means, with a power supply unit that serves to supply the force-measuring modules with electrical power. The power delivery means of at least one force-measuring module in this arrangement is connected directly or by way of a junction element to a control cable that is connected to the power supply unit, and the at least two force-measuring modules are connected directly to each other by means of a module-connection cable which serves to transfer electrical power. With this cabling arrangement, the overall cable length of the multiple force-measuring device can be reduced, because the sum of all cable lengths for direct connections between the force-measuring modules is always smaller than for a star-shaped distribution arrangement. The result is a cost-effective design configuration which in addition, due to its clear and simple structure, makes it easy to recognize failures during operation and maintenance.

Besides, there is no need for distribution cables, distribution devices, segment couplers and segment conductors. By eliminating these devices and cable connections, the fail-safety of the force-measuring device can be improved significantly. These advantages are brought to bear particularly in the assembly and operation of larger installations, as the complexity of the installation increases only to an insignificant extent with an increasing number of force-measuring modules.

The term "power delivery means" encompasses all devices that serve to supply the force-measuring module with electric power, such as supply cables, distribution cables, voltage converter, current converters, stabilizers, smoothing elements or filter elements. Also included are the voltage supplies for communication leads, for example the CAN power supply of a CAN bus communication system.

The term "cable" includes all kinds of electrical conductor lines such as single-lead or multi-lead cables, stranded conductors, or wires, as well as the delivery of electrical current through fixed devices such as ground rails, housings and connecting rods. The junction element can be realized in the most different ways, for example as a simple T-element, as a housing with connector terminals, as a forked cable or as a cable breakout.

In a further embodiment, at least three force-measuring modules are connected in chain-like manner to each other by means of the module-connection cable, with the first force-measuring module and the last force-measuring module in the chain each being connected directly or through the junction element to the control cable. With this arrangement of supplying current through more than one in-feed connection, one achieves a clear reduction in the voltage drop at the force-measuring modules, particularly at those force-measuring modules that are supplied with current or with electrical energy by way of a large number of other force-measuring modules arranged in between in the chain. Furthermore, the junction element in this embodiment can be of a particularly simple configuration, as only two force-measuring modules have to be connected to the control cable. With this arrangement, a particularly simple and cost-effective design is achieved for the multiple force-measuring device.

In a special embodiment, no more than one force-measuring module is connected to the control cable. Thus, the junction element can be omitted, whereby the number of required components is reduced and thus the fail-safety is improved.

Further, in a preferred embodiment all force-measuring modules are connected to each other in a chain-like manner by means of a module-connection cable. In this way, one achieves a particularly simple, clear and cost-effective arrangement.

In a further embodiment, each of the force-measuring modules includes a means of communication, and through the module-connection cable it is in addition possible to transmit communication signals between these means of communication. This transmission can be realized in particular by means of a bus system, in appropriate cases by means of a CAN bus system. This concept avoids the need to arrange an additional communication setup. Besides, a bus topology can be combined in a particularly advantageous way with the chain-like arrangement of the force-measuring modules. The communication signals can in this case be directed through separate leads independent of the power supply line in the module-connection cable, as well as together with the power supply line through common leads in the module-connection cable.

In the same manner as in the module-connection cable, the communication, likewise, can be transmitted through the control cable, for example through separate leads, or together with the power supply through common leads.

The term "communication means" encompasses all elements that serve for the transmission of data, in particular sender- and receiver elements, processing elements for analog and/or digital data, transponders, impedance converters, transmitters, conductor terminals, plug connecters or couplings. The communication signals can be of analog or digital nature in the form of measurement values, pre-processed measurement values, intermediate values or final measurement results, computed results, time records of events, in particular times when threshold values were exceeded. Furthermore, additional data and measurement parameters can be transmitted, for example identification data of the force-measuring modules, data regarding the time and location of measurements, or information about the operating states of the force-measuring modules. Furthermore, data such as control information, operating parameters, control programs, or calibration data can be transmitted to the force-measuring modules.

Preferably, the communication signals of the force-measuring modules are transmitted to a terminal or from a terminal. The terminal can in this case be configured as a lead computer, as a system controller, a process control system, but also as a simple output instrument, for example as a display screen and/or as a printer. Particularly in smaller installations, the functions of power supply, processing of the measurements, control of the force-measuring device, and display can be combined in one device, for example in an office computer.

In a further embodiment, each of the force-measuring modules has a device for determining and/or monitoring the electrical voltage of the power delivery means. The device can in particular serve to determine and/or monitor the positive voltage and/or the negative voltage, wherein the voltages can be determined and/or monitored, if applicable in reference to a common potential, in particular the ground potential. Valuable information can thereby be gained regarding the operating condition of the power supply of the force-measuring modules as well as regarding the condition of the module-connection cable.

In a preferred embodiment, the monitoring of the voltage is accomplished by examining whether the measured values are within threshold values, and if the threshold values were found to be exceeded, actions are triggered such as transmitting messages and/or recalibrating or switching off the respective force-measuring module. This makes it possible on the one hand that failures in the force-measuring modules and/or the module-connection cables are recognized early and on the other hand that the location of these errors can be pinpointed more easily. With this concept, the monitoring can be active during the installation and/or calibration as well as during operation of the force-measuring device.

Furthermore, by determining the voltage of the power delivery device and/or the time profile of said voltage, one obtains essential information about the current condition and anticipated future operating experience of the force-measuring module. Thus, these data can provide information in regard to anticipated future servicing needs, the advancement of the aging process, the change of the ambient conditions, or the anticipated remaining operating life of the force-measuring modules. For example a strong rate of change of the voltage in a cell can indicate a corrosion-related damage in the coupling device of a force-measuring module. This monitoring surveillance is particularly advantageous in large installations with a multitude of force-measuring modules.

The threshold values can be determined through theoretical calculations, taking into account in particular the characteristic quantities of the module-connection cable such as the length and cross-section of the conductor lines and/or the internal resistance values of the force-measuring module, and/or through reference measurements. The reference measurement values can be obtained preferably from measurements in a newly installed and/or newly calibrated force-measuring device and stored in a memory unit. The reference values and/or threshold values can also be taken from manuals and operating instructions. In addition, they can also be specified by the manufacturer or transmitted to the installation from the manufacturer as needed. It is particularly advantageous to store the reference values and/or the threshold values in the individual force-measuring modules, whereby a modular interchangeability of the modules can be achieved.

In a further embodiment, all module-connection cables have a largely identical conductor resistance, in particular largely identical lengths, materials and conductor cross-sections. In this case, the threshold values are particularly easy to determine through calculations of voltage divider circuits.

In a further embodiment, the junction element and/or the force-measuring modules include a device for the monitoring of the termination of the communication connection and/or for effecting the termination. Since the lack of a termination can cause problems in the transmission of the communication signals, this concept allows the problems to be detected and reported or even to be automatically corrected by the force-measuring device.

In a further embodiment, the force-measuring module or the module-connection cable includes a device for interrupting the continuity in the power supply circuit. This provides the possibility to ensure that the delivery of power is limited to a certain maximum number of force-measuring modules. Thereby it can be assured for example that the supply current can be transmitted between a maximum of four power delivery means. This allows the maximum power being transmitted through the power supply, in particular the maximum current, to be kept below a certain maximum value.

This limitation of the current is particularly important in hazardous environments where an explosion danger exists and where special regulatory requirements have to be met in regard to the maximum current consumption of the force-measuring modules and/or the force-measuring device. Furthermore, this interruption allows the force-measuring device to be subdivided into different, independently supplied subsystems. This separation can be achieved for example by means of manual or electromagnetic switches or by means of a special module-connection cable. In the case of the special module-connection cable it is possible for example that the communication leads have contact connectors providing a continuous conductive path, while the leads for the power supply have no contacting connectors, so that the conductive path is interrupted. The conformance to the regulations on current limitation can also be monitored by the terminal, and a reconfiguration of the force-measuring device can be effected through appropriate control commands from the terminal to the force-measuring modules.

In a further preferred embodiment, the force-measuring module also includes at least one plug connector, in particular two plug connectors where the module-connection cable and/or the control cable can be connected. This provides an efficient way of setting up, testing and servicing the force-measuring device.

In a further embodiment, force-measuring module includes a plug connector which is encapsulated against environmental influences, in particular dirt, liquids or gases and/or whose at least one electrical contact surface is designed to be corrosion-resistant. With this measure, a fail-safe operation of the installation is also achieved in particular in harsh ambient conditions.

BRIEF DESCRIPTION OF THE DRAWINGS

Details of the disclosed force-measuring device, the force-measuring module, and the method will become evident from the description of the examples of embodiments represented in the drawings, wherein.

DETAILED DESCRIPTION OF THE PREFERRED EMBODIMENTS

Figure 1:
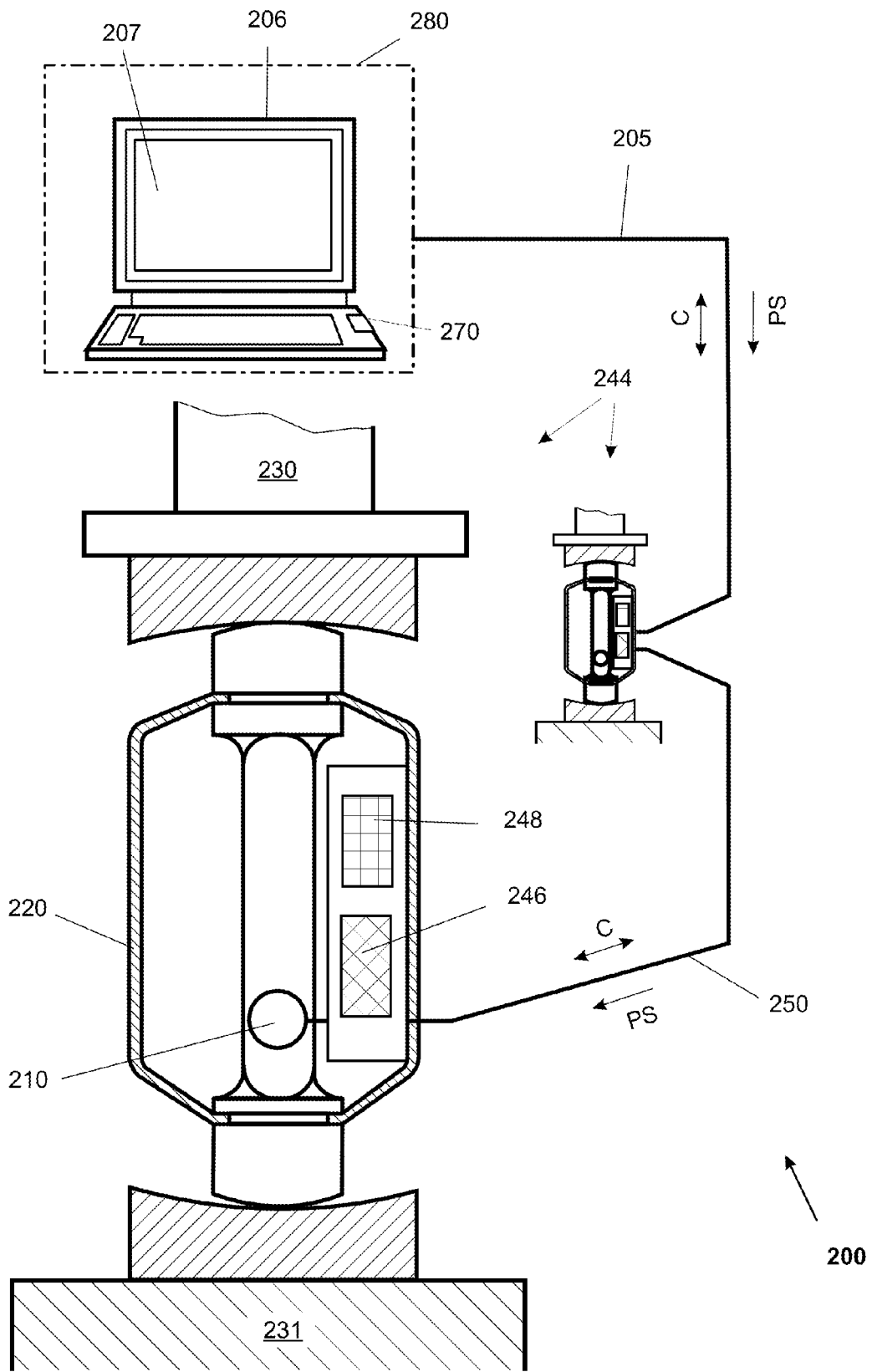
FIG. 1 is a schematic depiction of a multiple force-measuring device with two force-measuring modules, each of which includes a force-measuring cell, a power delivery means, and a communication means, which are connected to a controller device by way of module-connection cables and a control cable.

FIG. 1 shows a multiple force-measuring device 200 in the form of a tank-load weighing device. For the weighing of a container, a plurality of force-measuring modules 244 are arranged between the feet of the container 230 and the foundation 231, so that each foot of the container 230 rests on a force-measuring module 244. In order to determine the weight of the container and/or of its contents, the measurement values determined by the force-measuring modules 244 need to be added, as each measurement value represents a part of the mass. To perform the addition, the measurement values of the individual force-measuring modules 244 are transmitted to a terminal 206, where they are processed and presented on the display 207. The terminal 206 is arranged in a remotely located controller device 280.

The force-measuring module 244 includes a force-measuring cell 210 which is enclosed in a housing 220. Typically, the housing 220 is welded to the force-measuring cell 210 and tightly sealed against the ambient environment of the force-measuring device 200. In performing a measurement, the force-measuring cell 210 as well as the housing 220 are elastically compressed. The deformation of the force-measuring cell 210 is measured by means of the force-measuring cell 210 and directed to a communication means 248.

The power supply of the force-measuring module 244, in particular of the associated electronic circuit, the force-measuring cell 210 and the communication means 248 is made possible by a power delivery means 246 which, in turn, is supplied by the power supply PS. This power supply unit 270 of the multiple force-measuring device 200 is arranged in the controller device 280 and incorporated in the terminal 206.

The force-measuring modules 244 are connected directly to each other by means of a module-connection cable 250. This module-connection cable 250 can transmit the supply current PS as well as the communication C between the force-measuring modules 244. The module-connection cable 250 therefore connects the power delivery means 246 and the communication means 248 of the individual force-measuring modules 244 to each other. Further, a force-measuring module 244 is connected through a control cable 205 to the controller device 280. The control cable 205, the so-called home-run cable bridges the often major distance between the segment coupler 204 and the controller device 280 and thus establishes the immediate connection to the controller device 280.

This power supply unit 270 of the multiple force-measuring device 200 is arranged in the controller device 280 and incorporated in the terminal 206. The distribution of the power supply PS occurs through the control cable 205 and the module-connection cable 250 to the power delivery means 246 of the individual force-measuring modules 244.

In the same way, the communication means 248 of the force-measuring modules are connected to the terminal 206 in order to transmit the signals of the communication C, in particular the measurement values, the processed results and the control commands. This communication C is transmitted bidirectionally from the communication means 248 to the terminal 206, i.e. from the communication means 248 through the module-connection cable 250 and the control cable 205 to the terminal 206 in the controller device 280.

Figure 2:
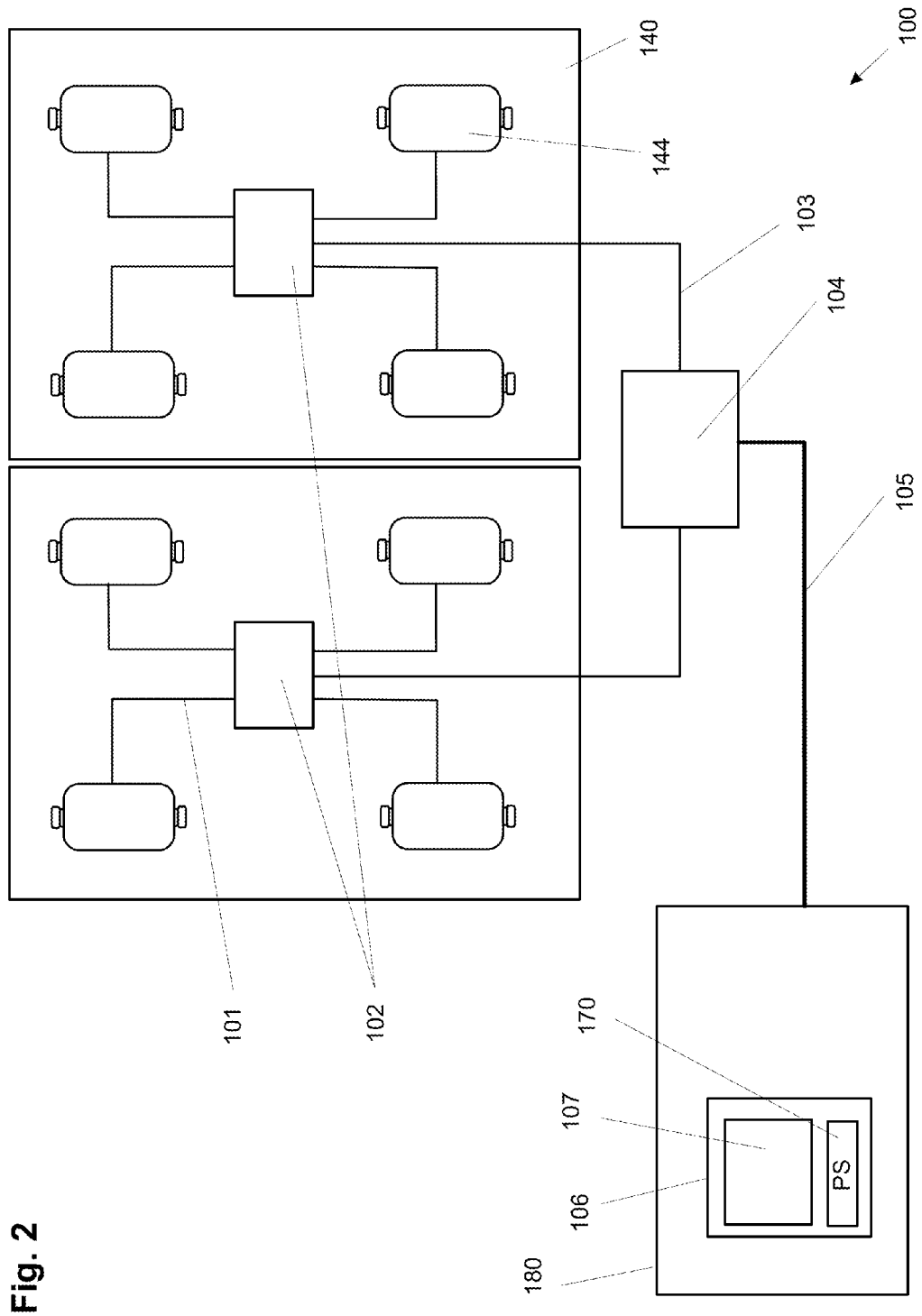
FIG. 2 illustrates a multiple force-measuring device according to the state of the art in the form of a truck-weighing installation with two measuring plates, each of which is supported by four force-measuring modules.

To illustrate the existing state of the art, FIG. 2 schematically represents a multiple force-measuring device 100 in the form of a truck scale. The latter has two independent measuring plates 140, each of which is supported by four force-measuring modules 144. For the weighing, the trucks are put on the measuring plates, and the resultant forces are measured by means of the force-measuring modules 144. The processing of the measurement results occurs in the terminal 106.

Each force-measuring module 144 is connected through a distribution line 101 to a distribution device 102. The distribution device 102, in turn, is connected through a segment cable to a segment coupler 104. The segment coupler 104, finally, is connected through a control cable 105 to the controller device 180. The segment coupler 104 couples two independent, physically separated segments of the multiple force-measuring device 100 together. A segment is in each case formed by a measuring plate 140, the associated force-measuring modules 144, the distribution lines 101, the distribution device 102, and the segment cable 103.

The power supply unit 170 is incorporated in the terminal 106 which includes a display 107 and which is arranged in the controller device 180. The distribution of the power supply PS occurs through the control cable 105, the segment coupler 104, the segment cable 103 and the distribution device 102, and finally through the distribution line 101 to the individual force-measuring modules 144. In the opposite direction the measurement values of the force-measuring modules are transmitted to the terminal 106, i.e. from the force-measuring module 144 through the distribution line 101, the distribution device 102, the segment cable 103, the segment coupler 104, and the control cable 105 to the terminal 106.

Figure 3:
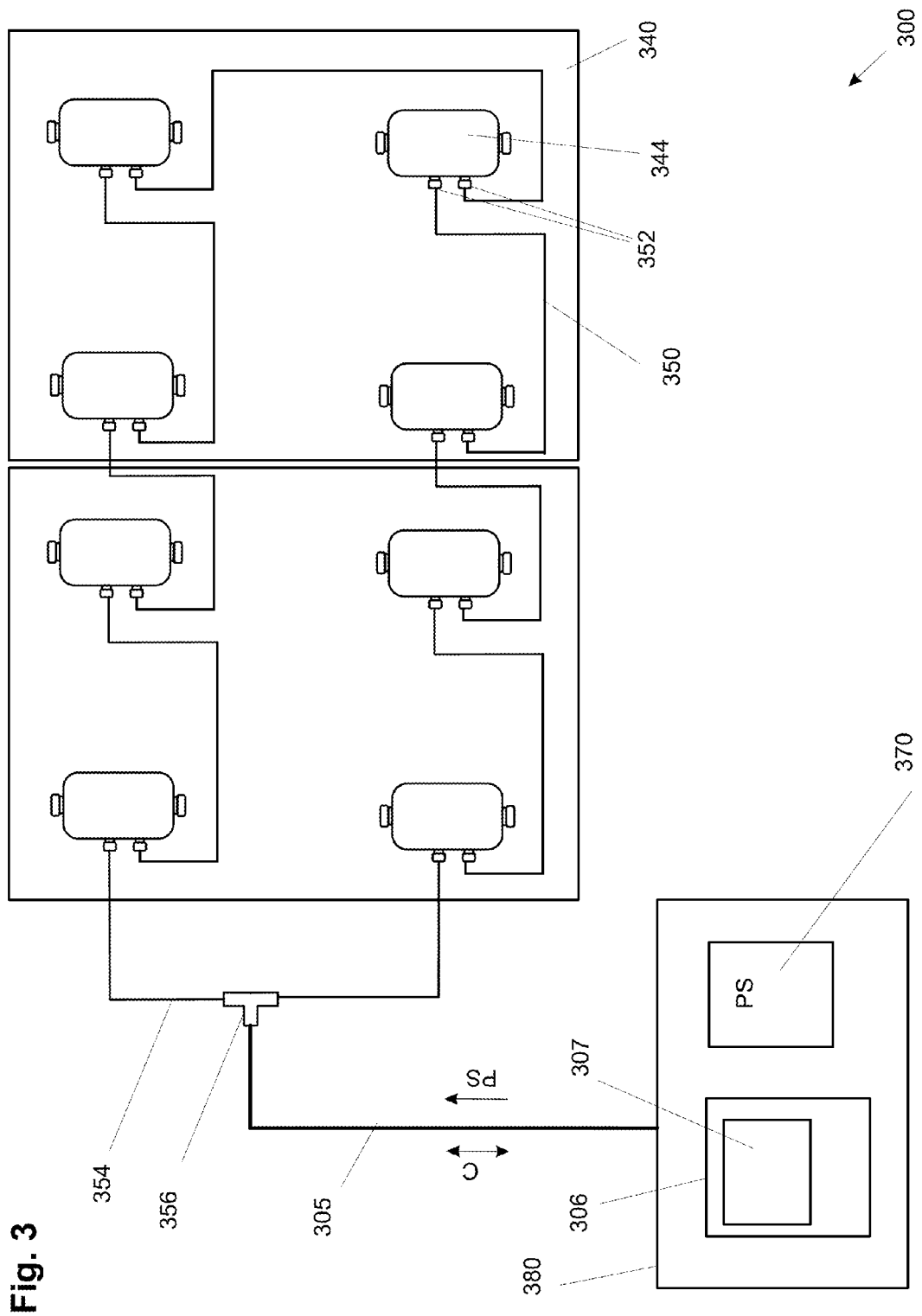
FIG. 3 shows a configuration of a multiple force-measuring device, similar to the FIG. 2 device, but wherein the force-measuring modules are connected directly to each other in a chain-like arrangement through a module-connection cable, and wherein the first and the last force-measuring module of the chain is connected through a forked cable with a junction element to the control cable.

FIG. 3 shows a configuration of the multiple force-measuring device 300. The force-measuring modules 344 are connected to each other directly as a chain through module-connection cables 350. These module-connection cables 350 can transmit the power supply PS as well as the communication C between the force-measuring modules 344. The module-connection cable 350 therefore connects the power delivery means 246 and the communication means 248 of the individual force-measuring modules 344 to each other.

The communication C can for example consist of the transmission of measurement values and their processed results in one direction and of control commands in the opposite direction. This bidirectional communication C can be transmitted through separate cable connections independent of the power supply PS and/or together with the power supply conductors in separate leads within the same cable and/or in the power supply leads, preferably as a modulated signal.

The module-connection cable 350 is at both ends connected to force-measuring modules 344 by means of plug connectors 352. Accordingly, each force-measuring module 344 has two plug connectors 352, through which the two neighboring modules in the chain can be respectively connected. However, in the case of the first and the last force-measuring module 344, only one neighboring module of the chain is connected.

Furthermore, the first and the last force-measuring module 344 in the chain are each connected through a forked cable 354 and a junction element 356 to the control cable 305. The fork junction element is in this case configured as a simple T-junction and serves to split the power supply PS and the communication C into respective branches leading to the first and the last force-measuring module 344 of the chain. Accordingly, the distribution lines 101, distribution devices 102, segment cables 103 and segment couplers 104 are absent in this arrangement.

Finally, the power supply PS provided by the power supply unit 370 to the force-measuring modules 344 as well as the communication C between the terminal 306 and the force-measuring modules 344 are transmitted through the control cable 305. Besides, in this embodiment the force-measuring modules 344 are supplied with power or with electrical energy not by the terminal 306 but by a separate power supply unit 370. The power supply unit 370 together with the terminal 306 and the display 307 is located in the controller device 380.

Figure 4:
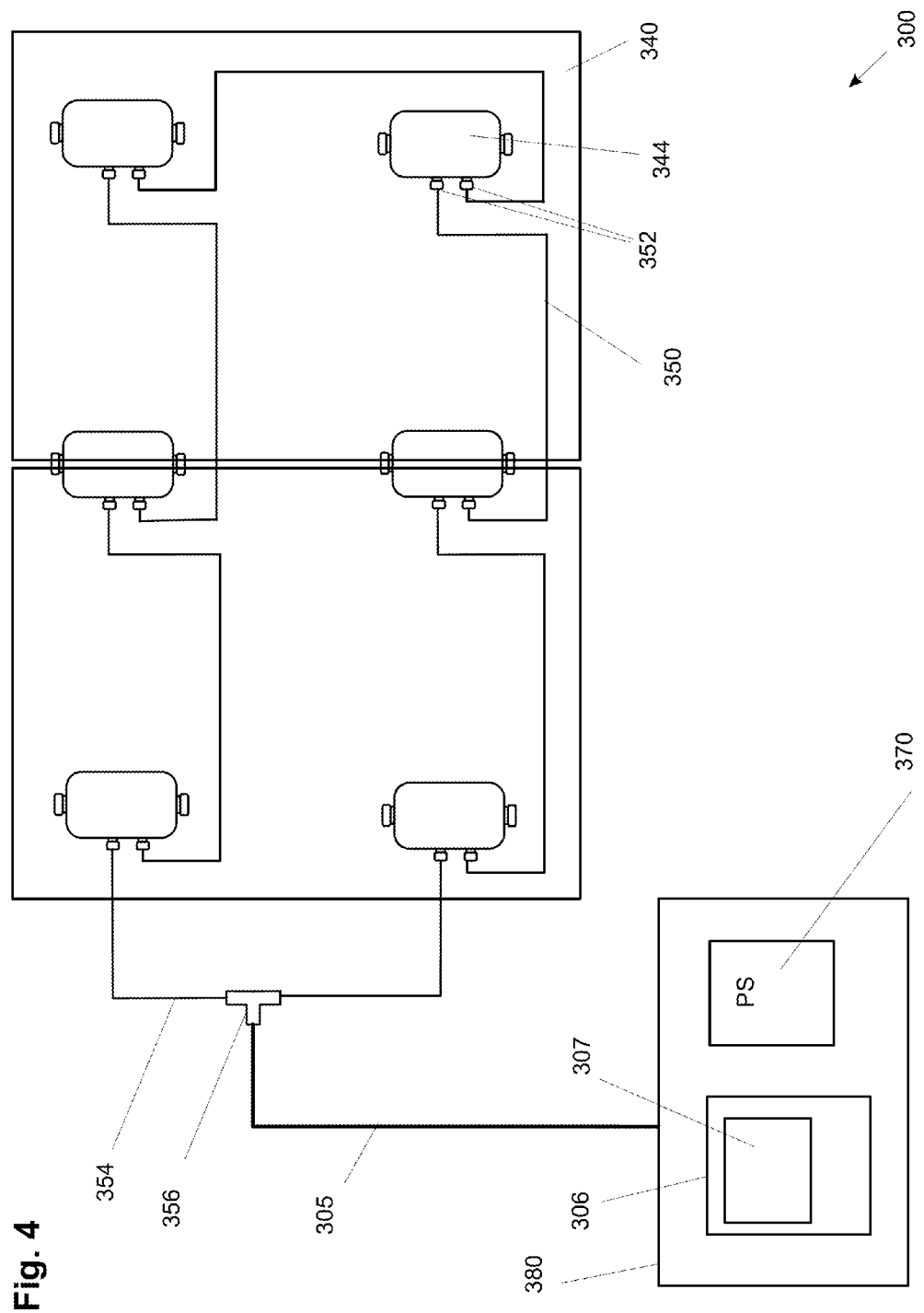
FIG. 4 depicts an embodiment of the FIG. 3 multiple force-measuring device, but with two force-measuring modules, each of which measures the weight contributions from two measuring plates.

A further embodiment of the multiple force-measuring device 300 is illustrated in FIG. 4. This embodiment is analogous to the embodiment of FIG. 3, except that two of the force-measuring modules 344 are used so that each of them measures the weight contributions from both measuring plates 340. This double force introduction can be achieved for example with a flexibly supported mechanical device. As a result of this arrangement the number of force-measuring modules 344 required is reduced from eight to six.

Figure 5:
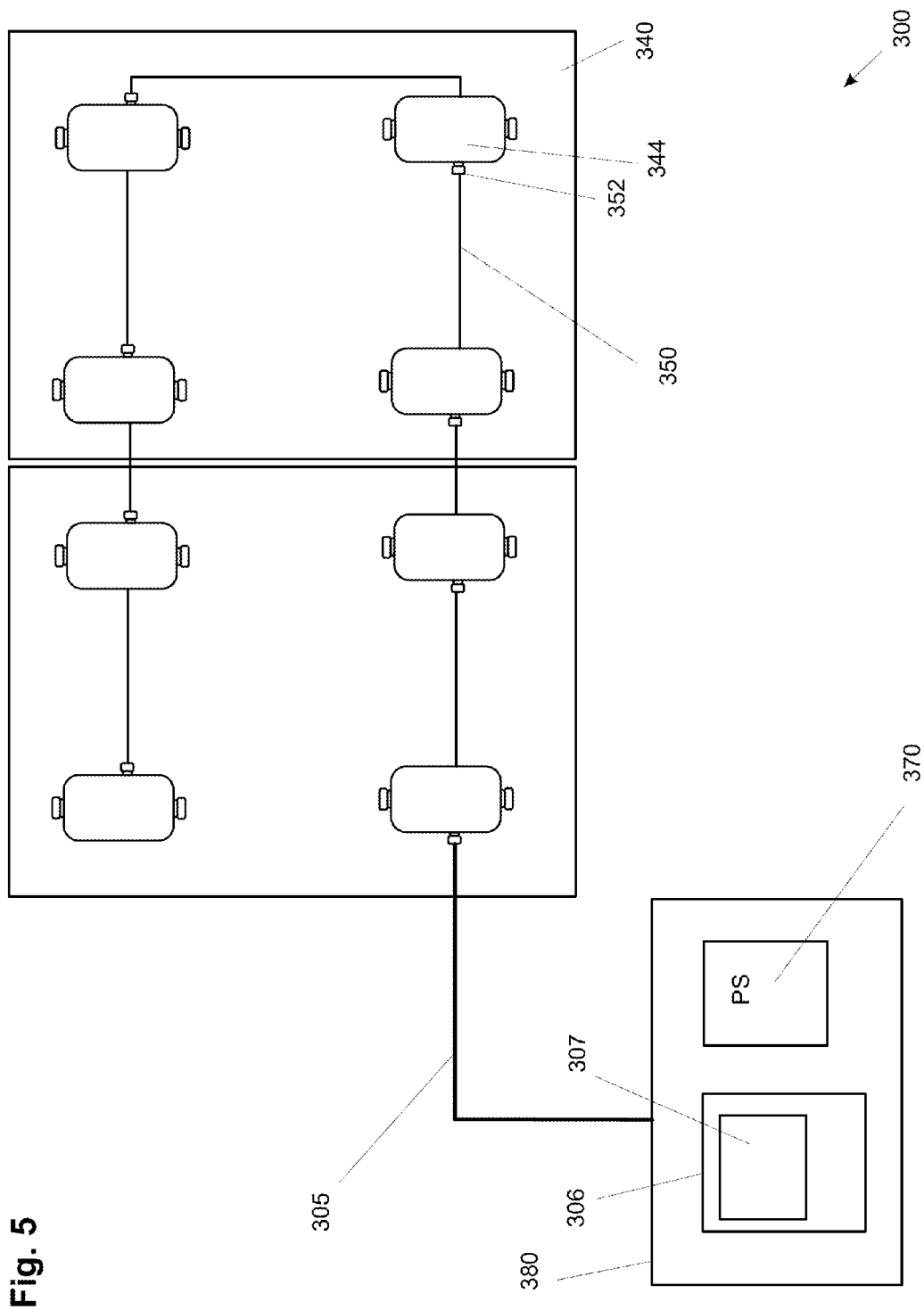
FIG. 5 depicts a further embodiment of the FIG. 3 multiple force-measuring device, but with a direct connection of an individual force-measuring module to the control cable.

A further embodiment of the multiple force-measuring device is represented in FIG. 5. This arrangement is analogous to that of FIG. 3, except that in this case only one force-measuring module 344 is connected to the control cable 305. Thus, the forked cable 354 and the junction element 356 are not needed, which makes this arrangement particularly cost-effective and stable.

Furthermore, the module-connection cables 350 are connected at one end to a plug connector 352 and at the other end directly to the force-measuring module 344. The direct connection can be realized for example as a clamped connection, a screw connection, a fixed wiring connection or a soldered connection. With this arrangement, a further cost savings can be achieved as well as an increase in stability.

Figure 6:
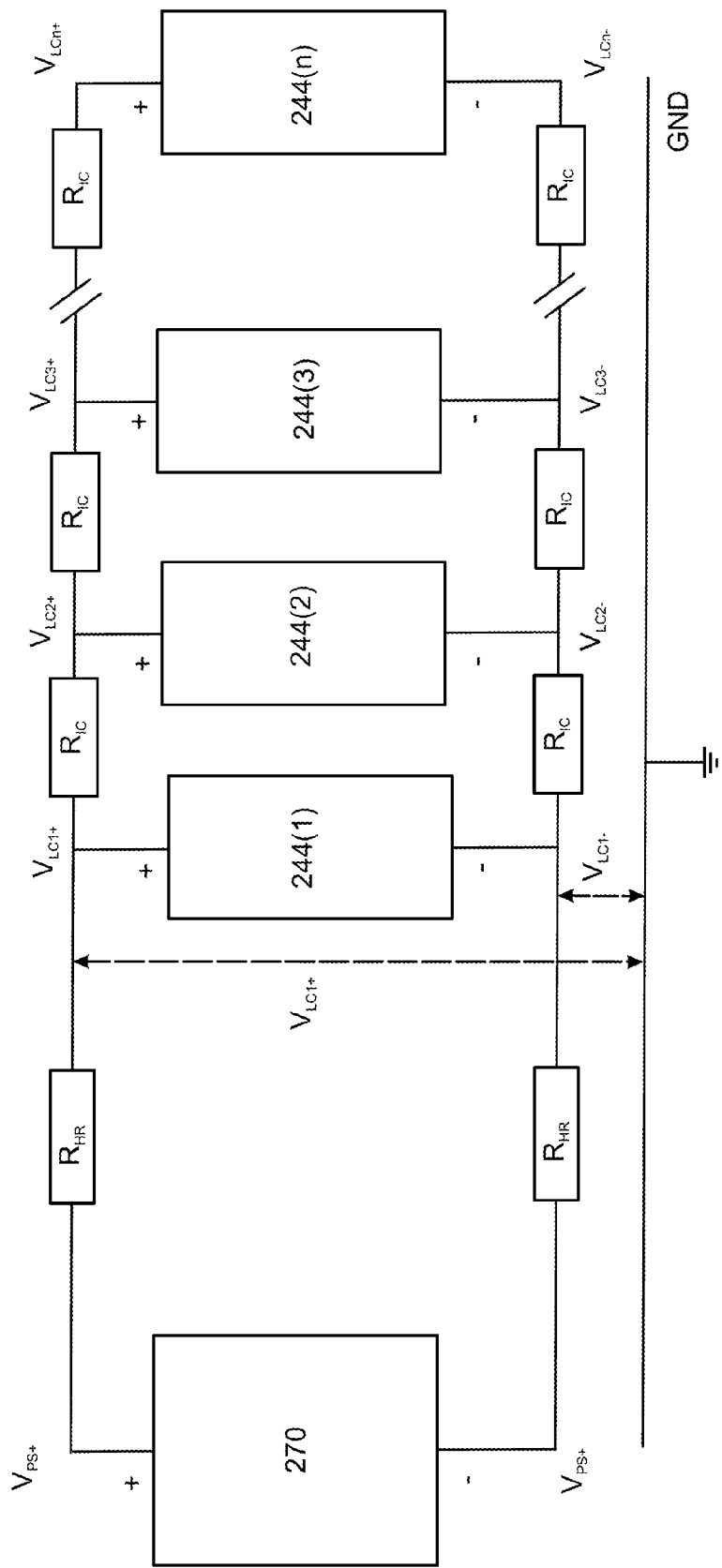
FIG. 6 is a simplified circuit schematic of the multiple force-measuring device with a power supply unit, 1 to n force-measuring modules, conductor resistances, electrical voltages and a common ground connection.

FIG. 6 shows a simplified block schematic of the multiple force-measuring device 200 with a power supply unit 270, 1 to n force-measuring modules 244(1) . . . 244(n), conductor resistances $R_{HR}$, $R_{IC}$, electrical voltages $V_{LC1+}, \ldots, V_{LCn+}, \ldots, V_{LC1-}, \ldots, V_{LCn-}$, and a common ground connection GND.

The conductor resistances $R_{HR}$, $R_{IC}$ represent the respective resistance values $R_{HR}$ of the control cable 205 and $R_{IC}$ of the module-connection cable 250. Accordingly, a positive voltage $V_{LCi+}$ and a negative voltage $V_{LCi-}$ of the power supply relative to the common ground potential can be measured at each force-measuring module 244(i), 1≤i≤n. These voltages are characteristic for each individual force-measuring module 244(1) . . . 244(n). The ground potential is set by the cable screen and/or by the housings of the force-measuring modules 244(1) . . . 244(n) and in particular by connecting the entire force-measuring device 200 to ground.

Preferably, the measured voltages $V_{LC1+}, \ldots, V_{LCn+}, \ldots, V_{LC1-}, \ldots, V_{LCn-}$ are compared to the expected values or to threshold values and/or tolerance values. When these values are exceeded, this is communicated to the terminal through specific signals. The terminal can trigger actions accordingly, such as alerting, informing or warning the user, or correcting the measurement values, or calibrating or adjusting the measuring device.

In this embodiment, the conductor resistances $R_{IC}$ of the module-connection cables 250 are largely identical. This can be achieved through a suitable choice of the length, materials and conductive cross-section of the individual conductor lines in the module-connection cable 250. In this way, the values to be expected and the corresponding threshold values for the voltage $V_{LC1+}, \ldots, V_{LCn+}, \ldots, V_{LC1-}, \ldots, V_{LCn-}$ can be found through a simple calculation. In like manner, largely identical conductor resistance values $R_{HR}$ of the control cable 205 are achieved through a suitable choice of the leads of the control cable 205. However, a calculation of the values to be expected and of the threshold values can also be performed without a problem for conductor resistances of arbitrary magnitude.

In the embodiments, the communication means 248 can, depending on the configuration of the multiple force-measuring device 200 and the terminal 206, automatically transmit pertinent information to the terminal 206 either continuously or periodically and/or at random or after a change has occurred. Of course it is also possible that the terminal 206 interrogates the communication means 248 for information such as measurement values or measurement results either continuously or periodically and/or according to the principle of randomization.

The method described herein can be performed by means of centralized and/or decentralized parts of a controller device of an installation, for example with the terminal 206 and/or the force-measuring module 244, which are for this purpose equipped with the appropriate operating programs. However, it is also possible to divide the tasks between different levels of the process control. Through appropriate measures, the method can thus be implemented on any single-level or multi-level installations at little cost. The terminal 206 and/or the junction element 256 can also be installed in a mobile instrument which can, through radio connections, call for individual measurement values and/or measurement results. For the radio communication, the individual force-measuring modules 244 can be given an identification code, as is known and being practiced in state-of-the-art solutions for many applications.

What is claimed is:

1. A multiple force-measuring device, having a mechanical means for receiving the force, with the device receiving electrical power from a power supply unit and providing at least a force-measurement signal to a terminal, the device comprising:
   a plurality of force-measuring modules, comprising a first force-measuring module, a last force-measuring module and, optionally, one or more intermediate force-measuring modules; each force-measuring module comprising:
   a load cell, arranged to be deformed by the force received;

a communications means, arranged to receive a signal from the load cell and having an input and an output; and a power delivery means, arranged to power the load cell and the communications means and having an input and an output;

a control cable, connecting the power supply unit and the terminal, respectively, to the input of the first force-measuring module; and at least one module connection cable, each module connection cable connecting the outputs of one of the force-measuring modules to the corresponding inputs of another one of the force-measuring modules, thereby receiving and passing power and said at least force-measurement signal through a chain defined thereby.

2. A multiple force-measuring device, having a mechanical means for receiving the force, with the device receiving electrical power from a power supply unit and communicating with a terminal by providing at least a force-measurement signal thereto, the device comprising:

a plurality of force-measuring modules, comprising a first force-measuring module, a last force-measuring module and, optionally, one or more intermediate force-measuring modules; each force-measuring module comprising:
  a load cell, arranged to be deformed by the force received;
  a communications means, arranged to receive a signal from the load cell and having first and second ports; and
  a power delivery means, arranged to power the load cell and the communications means and having an input and an output;
a forked control cable, connecting the power supply unit and the terminal, respectively, to the input of the first and the last force-measuring module; and
at least one module connection cable, each module connection cable connecting the outputs of one of the force-measuring modules only to the corresponding inputs of another one of the force-measuring modules, thereby receiving and passing power and said at least force-measurement signal through a chain defined thereby.

3. The multiple force-measuring device of claim 2, wherein:
each module connection cable is a CAN bus system.

4. The device of claim 1, wherein:
the module connection and control cables define a network that is devoid of distribution devices, segment cables, and or segment couplers.

5. The device of claim 2, wherein:
the module connection and control cables define a network that is devoid of distribution devices, segment cables, and or segment couplers.

6. The device of claim 1, wherein:
the minimum required length of the module-connection cable is equivalent to the physical spacing between the force-measuring modules.

7. The device of claim 2, wherein:
the minimum required length of the module-connection cable is equivalent to the physical spacing between the force-measuring modules.

8. The device of claim 1, wherein:
the control cable can be connected directly to any of the force-measuring modules in a network, thereby establishing the first force-measuring module, based on at least one of:
minimizing the physical distance between terminal and a force-measuring module; and
most convenient location based on the layout of the multiple force-measuring device.

9. The device of claim 2, wherein:
the forked control cable can be connected directly to any two of the force-measuring modules in a network, thereby establishing the first and last force-measuring module, based on at least one of:
minimizing the physical distance between terminal and a force-measuring module; and
most convenient location based on the layout of the multiple force-measuring device.

10. A method for determining and monitoring the condition of a multiple force-measuring device, comprising the steps of:
providing a multiple force-measuring device according to claim 6;
recognizing a connection between multiple force-measuring modules in at least one of: a terminal, and one of the force-measuring modules; and
monitoring a communications means that interconnects the force-measuring modules with each other; and
terminating the connection provided by the communications means, if applicable.

11. The method of claim 10, wherein:
the voltage of the power supply is monitored.

* * * * *